(No Model.)
G. GRIMSHAW, Jr.
SKEIN LACING AND TYING ATTACHMENT FOR REELS.
No. 293,164. Patented Feb. 5, 1884.
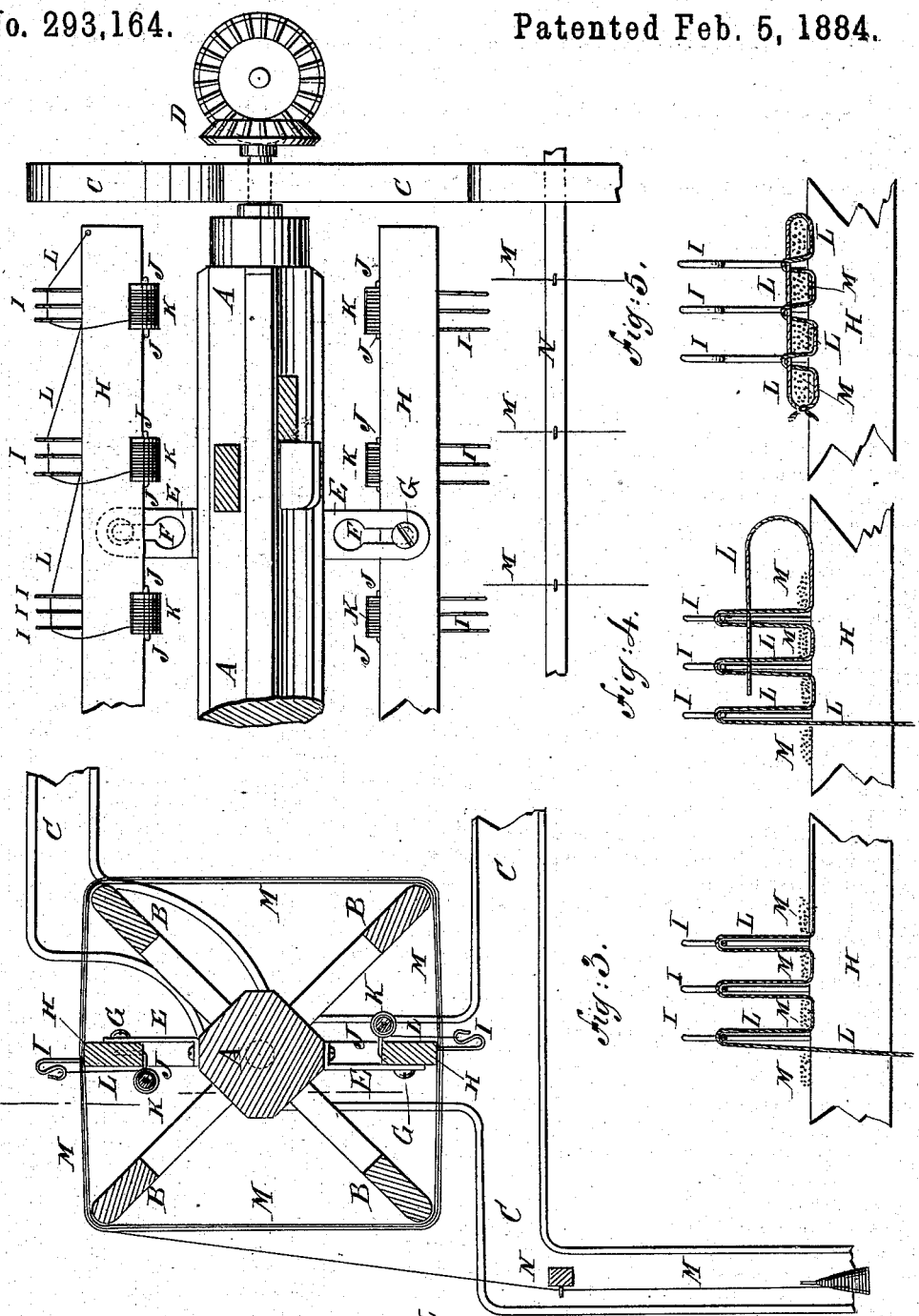
WITNESSES:
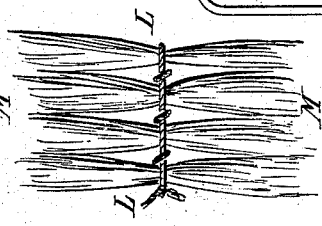
INVENTOR:
G. Grimshaw Jr.
BY Munn & Co
ATTORNEYS.

UNITED STATES PATENT OFFICE.

GEORGE GRIMSHAW, JR., OF PATERSON, NEW JERSEY.

SKEIN LACING AND TYING ATTACHMENT FOR REELS.

SPECIFICATION forming part of Letters Patent No. 293,164, dated February 5, 1884.

Application filed May 18, 1883. (No model.)

*To all whom it may concern:*

Be it known that I, GEORGE GRIMSHAW, Jr., of Paterson, in the county of Passaic and State of New Jersey, have invented a new and useful Improvement in a Skein Lacing and Tying Attachment for Reels, of which the following is a full, clear, and exact description.

Reference is to be had to the accompanying drawings, forming a part of this specification, in which similar letters of reference indicate corresponding parts in all the figures.

Figure 1 is a sectional end elevation of my improvement shown as applied to a reel. Fig. 2 is a sectional side elevation of a part of the same. Fig. 3 is a front elevation of a part of the same, showing a band with the silk threads laid upon it. Fig. 4 is a front elevation of a part of the same, showing the end of the band passed through two of the loops. Fig. 5 is a front elevation of a part of the same, showing the band tied. Fig. 6 is a plan view of a part of a skein of silk shown as banded.

The object of the invention is to separate the silk into skeins, to hold them apart, and to facilitate the lacing and tying thereof, as hereinafter described.

A represents the shaft, and B the arms, of a silk-reel, which is journaled to a frame, C, and driven by gearing D in the ordinary manner.

To one or more sides of the reel-shaft A, and midway between the arms B, are attached brackets E, the projecting arms of which have slots F formed in them, to adapt them to receive the screws G. The inner ends of the slots F are enlarged to allow the heads of the screws G to pass through them.

H are one or more arms placed parallel with the reel-arms B, and secured to the outer arms of the brackets E by the screws G. The outer edges of the arms H are upon a level with the outer edges of the adjacent reel-arms B, so that the threads in passing around the reel will rest upon the outer edges of the arms H.

To the outer edge of each arm H are attached the shanks of hooks I, which hooks may be made in S shape, as shown in Fig. 1, or in any other suitable shape.

Upon hooks J or other suitable pivots attached to the inner edges of the arms H are placed spools K, upon which are wound the binding-threads L. From the spool K the binding-threads L pass to and are laid upon the hooks I, as shown in Fig. 2. The ends of the binding-threads L are secured to the shanks of the outer hook I of the next set, or to a pin or other support attached to the arm H. With this construction, as the threads M, to form the skein, are laid upon the reel A B by the traverse-bar N, in the ordinary manner, they will press down the binding-thread L into the spaces between the hooks I, forming loops, as shown in Figs. 3, 4, and 5. When enough thread M has been wound upon the reels A B for a skein, the end of the binding-thread L is detached and is passed through the loops of the said binding-thread, as shown in Figs. 4 and 5. The screws G are then loosened, and the bars H are pushed inward, withdrawing the hooks I from the skein. The binding-thread L is then drawn taut and tied, as shown in Figs. 5 and 6, and the skein is ready to be removed from the reel.

With this improvement the lacing and tying can be done in much less time than has heretofore been possible, the silk separated into skeins, and the skeins are less liable to become tangled in dyeing, and the thread can be more readily and quickly wound, and will be freer from knots than when the skein has been laced in the ordinary manner after having been reeled.

Having thus fully described my invention, I claim as new and desire to secure by Letters Patent—

1. The combination, with a silk-reel provided with a supporting-shaft, of the arm H, provided on its outer edge with a series of hooks, I, and upon its inner edge with supports adapted to carry spools for holding the binding-threads, and the supports E, said hooks being arranged in relation to one another as described, whereby intermediate spaces are formed, in which the skeins are wound, all as set forth.

2. The combination, with the reel-shaft A, of the slotted brackets E, the clamping-screws G, and the arms H, provided at their upper edges with hooks I and at their lower edges with spool-carrying pivots J, substantially as herein shown and described, whereby the lacing and tying will be done automatically while reeling the thread or yarn, as set forth.

GEORGE GRIMSHAW, JR.

Witnesses:
JAMES T. GRAHAM,
EDGAR TATE.